Patented Dec. 29, 1936

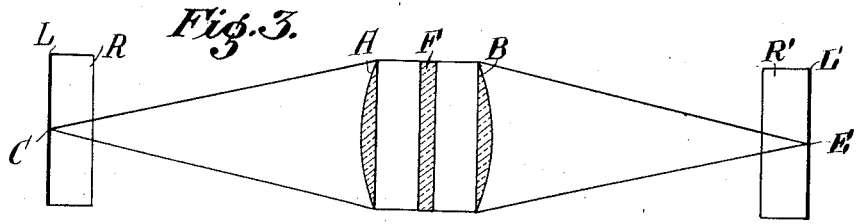
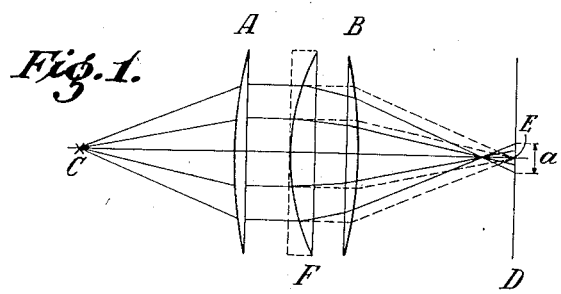
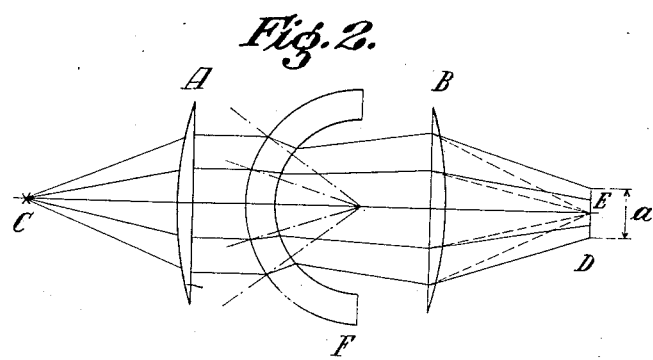
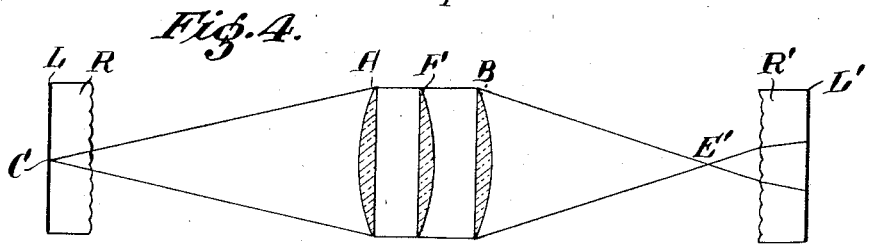

2,065,670

UNITED STATES PATENT OFFICE 2,065,670

PRINTING LENTICULAR FILM

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application February 27, 1934, Serial No. 713,184
In Germany February 28, 1933

2 Claims. (Cl. 88—24)

Our present invention relates to printing lenticular film on lenticular film and more particularly to printing optically.

One of its objects is to provide an improved process of optically printing lenticular film on lenticular film. Another object is an apparatus for this purpose. Further objects will be seen from the detailed specification following hereafter. Reference is made to the accompanying drawing in which Fig. 1 shows diagrammatically the principle of this invention when using a cylindrical lens, Fig. 2 shows diagrammatically the trace of the rays when using a semi-cylindrical tube, Fig. 3 shows diagrammatically an arrangement for printing according to this invention, and Fig. 4 shows a section of the printing arrangement shown in Fig. 3.

In printing a lenticular film optically on to another lenticular film, unserviceable prints are obtained by the production of moiré effects if the lenticular films are arranged so that their lenticular elements are parallel to each other. In order to avoid the formation of moiré effects several processes have already been proposed, which, however, necessitate a more or less considerable change of the printing apparatus. It has also been suggested to arrange the lenticular elements of one film so that they form an angle with the longitudinal direction of the film. However, the manufacture of such films presents considerable difficulties because the lenticular elements cannot in this case be produced with the same accuracy as when they extend parallel to the longitudinal direction of the film.

According to this invention a lenticular film may be optically printed on to another lenticular film while the embossings of the two films extend parallel to one another, by intercalating in the path of the light rays an optical system, which in the direction parallel to the lenticular elements does not affect the optical reproduction but perpendicularly to this direction extends the image of any point of the original to form a line transverse to the lenticular elements on the print and having the breadth of a lenticular element. For this purpose there may be used, for instance, a cylindrical lens having the required focal length, placed with its axis parallel to the lenticular embossing of the film. Instead of this cylindrical lens, there may be used a cylindrical tube made of glass or any other optically permeable material, or a part of such a cylindrical tube, for instance a semi-cylindrical tube. When a cylindrical tube or a part of such a tube is used the axis of the tube must likewise extend parallel to the lenticular embossing.

The present invention will now be more fully explained with reference to the accompanying drawing.

In Fig. 1 A and B are parts of the reproducing objective. By this objective the slot-shaped source of light C is projected as a line on the plane D through the point E perpendicularly to the plane of the paper; this line is seen as a point in the plane of the paper. In the figure this trace of the rays is represented in dotted lines. By insertion of the cylindrical lens F, the image of the slot is enlarged in the plane D, so that the projection of the source of light, in direction perpendicular to the drawing plane of the paper appears in the form of a strip having the breadth $a$. The trace of the rays, after insertion of the cylindrical lens, is represented in full lines. The focal length of the cylindrical lens is so chosen that the breadth $a$ of the reproduced light-slot corresponds with the breadth of a lenticular element.

Fig. 2 shows the effect of a semi-cylindrical tube of glass or another optically permeable material. A and B are again parts of a reproducing objective, C is a slot-shaped source of light which by the objective is reproduced in the plane D as a line perpendicular to the plane of the paper through the point E. By insertion of the semi-cylindrical tube F the path of the rays is altered in such a manner that the projection of the source of light is enlarged to a strip of the breadth $a$ corresponding with the breadth of a lenticular element.

Figs. 3 and 4 show diagrammatically an arrangement for printing lenticular film on another lenticular film whereby every point of the original is extended to the breadth of a lenticular element on the printing film in the direction perpendicular to the lenticular elements. Fig. 3 shows a section in direction of the lenticular elements and Fig. 4 shows a section perpendicular to the lenticular elements. In both figures R is the original with the emulsion layer L, A and B are parts of the objective, F is a cylindrical lens inserted between A and B, and R' is the printing film with the emulsion layer L'. As seen from Fig. 3 the point C of the original is projected to form a point E in the emulsion layer of the printing film, that is to say the trace of the light rays in the direction of the lenticular elements is not influenced by the cylindrical lens F and every point of the original is seen as a point on the printing film when viewed perpendicular to the direction of the lenticular elements. Contrary thereto as shown in Fig. 4 the point C of the original is projected to E' in front of the printing film and is extended to the breadth of one lenticular element when reaching the emulsion layer of the printing film, that is to say a line drawn on the original perpendicular to the lenticular elements having the breadth of one lenticular element is seen on the printing film when viewed in the direction of the lenticular elements as double the breadth of one lenticular element.

In printing processes wherein use is made of suitably shaped diaphragms, for instance, such as described in U. S. Patent No. 1,915,418 a cylindrical lens or a cylindrical tube is arranged in front of each aperture, so that the same effect is arrived at as with an optical device having the size of the diameter of the objective.

In the above the invention has been described with reference to the preferred embodiment, that is to say, each point of the original is extended to the breadth of a lenticular element. However, it is possible to extend the point of the original somewhat more or less without obtaining completely unserviceable prints.

What we claim is:

1. In an apparatus for optically printing a lenticular film on another lenticular film, in combination, an original lenticular film, a lenticular printing film spaced apart from and parallel to said original film with its lenticular elements parallel to those of the original film, an objective comprising two spaced components for projecting the original onto the printing film, a transparent member located between said components having a cylindrical surface inserted in the beam of the light rays between said lenticular films with its axis parallel to the lenticular elements, said cylindrical surface extending at least substantially across the columnated beam and serving to extend a point on the original film to the breadth of a lenticular element on the printing film.

2. Apparatus for printing lenticular film as defined in claim 1 in which the transparent member has coaxial cylindrical surfaces having radii of different lengths.

JOHN EGGERT.
GERD HEYMER.